United States Patent
Cowan

(10) Patent No.: US 11,441,782 B2
(45) Date of Patent: Sep. 13, 2022

(54) COOKING APPLIANCE USER CONTROL INTEGRATED WITH RATE OF MOVEMENT DETECTION

(71) Applicant: Midea Group Co., Ltd., Foshan (CN)

(72) Inventor: Richard W. Cowan, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 179 days.

(21) Appl. No.: 17/117,498

(22) Filed: Dec. 10, 2020

(65) Prior Publication Data

US 2022/0186934 A1 Jun. 16, 2022

(51) Int. Cl.
| | |
|---|---|
| *F24C 3/12* | (2006.01) |
| *G08B 21/18* | (2006.01) |
| *F24C 7/08* | (2006.01) |
| *F23N 5/24* | (2006.01) |
| *G01D 5/14* | (2006.01) |
| *F23N 5/18* | (2006.01) |
| *G01D 5/04* | (2006.01) |

(52) U.S. Cl.
CPC .............. *F24C 3/126* (2013.01); *F23N 5/245* (2013.01); *F24C 7/082* (2013.01); *G08B 21/182* (2013.01); *F23N 2005/185* (2013.01); *G01D 5/04* (2013.01); *G01D 5/142* (2013.01)

(58) Field of Classification Search
CPC .......... F23N 5/245; F24C 3/126; F24C 7/082; G08B 21/182
USPC .................. 126/1 R, 39 R, 42, 39 BA, 39 E
See application file for complete search history.

(56) References Cited

U.S. PATENT DOCUMENTS

| | | | |
|---|---|---|---|
| 7,428,901 | B2 | 9/2008 | Gama et al. |
| 7,527,072 | B2 | 5/2009 | Crnkovich |
| 9,709,284 | B2 | 7/2017 | Bach et al. |
| 2010/0253653 | A1 | 10/2010 | Stambaugh et al. |
| 2012/0285243 | A1 | 11/2012 | Yamamoto |
| 2013/0260320 | A1 | 10/2013 | Townsend |
| 2014/0001173 | A1 | 1/2014 | Holzgreve |
| 2015/0193073 | A1 | 7/2015 | Dmytriw et al. |
| 2017/0238751 | A1 | 8/2017 | Vengroff |
| 2020/0011534 | A1 | 1/2020 | Park et al. |
| 2020/0408412 | A1* | 12/2020 | Hanna ............... F24C 15/006 |

* cited by examiner

*Primary Examiner* — Vivek K Shirsat
(74) *Attorney, Agent, or Firm* — Middleton Reutlinger

(57) ABSTRACT

A cooking appliance may use a sensor to sense a rate of movement of a user control and generate an alert when the rate of movement meets an alert criterion, thereby enabling detection of potential inadvertent movements of a user control.

20 Claims, 5 Drawing Sheets

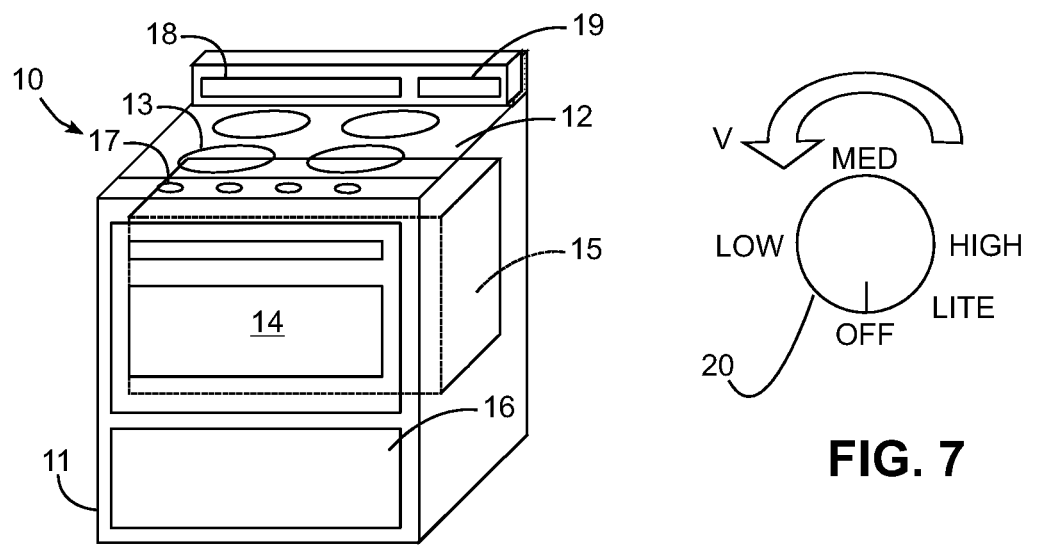
FIG. 1
FIG. 7
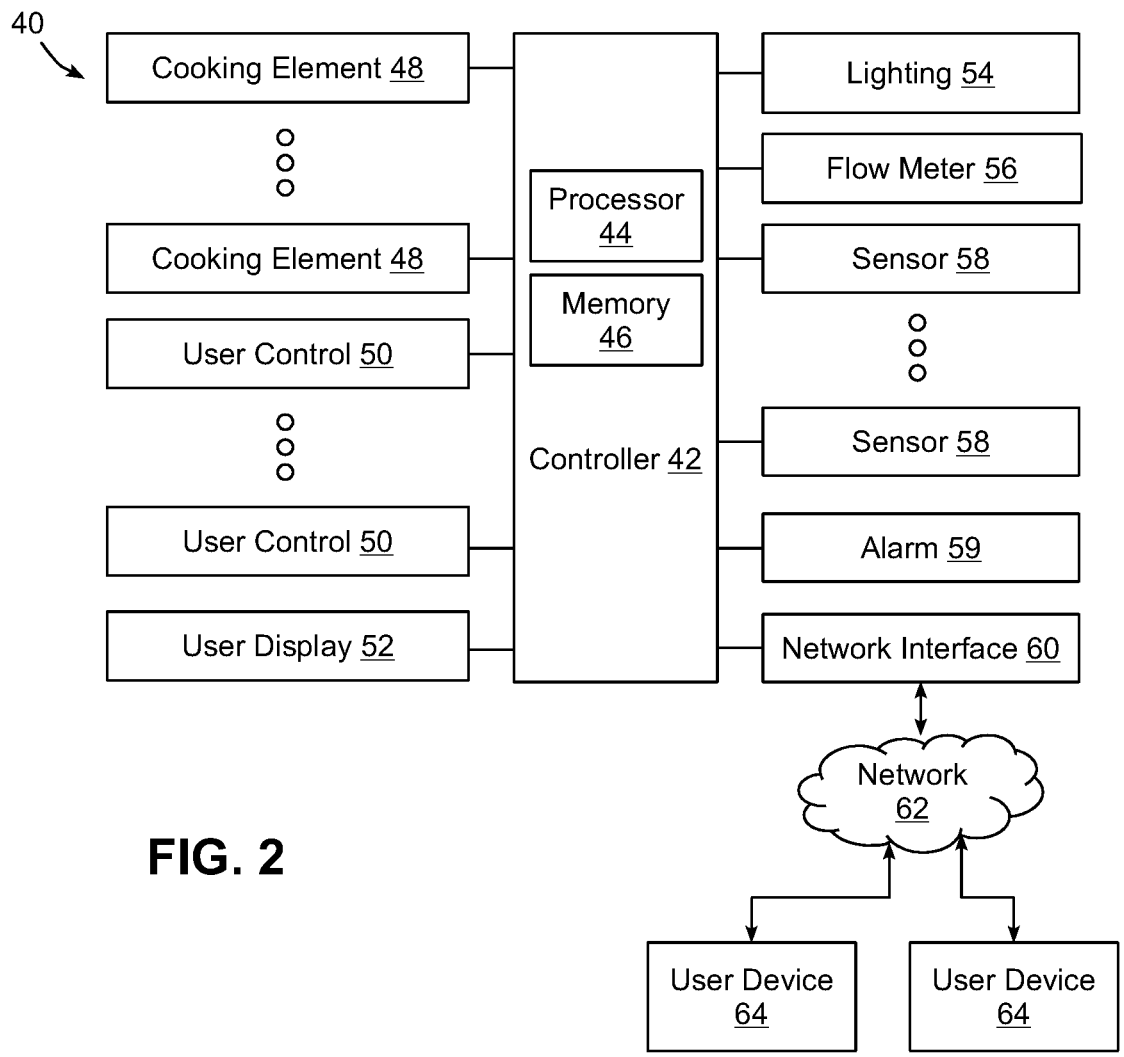
**FIG. 2

COOKING APPLIANCE USER CONTROL INTEGRATED WITH RATE OF MOVEMENT DETECTION

BACKGROUND

Cooking appliances such as cooktops or ranges have a variety of control or selector knobs for adjusting and controlling the amount of heat supplied to various appliance burners or cooking elements. For burners that rely on electrical power, turning a control knob generally energizes an associated electrical burner and causes the electrical burner to generate heat. For burners that rely on combustible gas such as natural gas or liquefied petroleum (LP) gas (also referred to as propane), turning a control knob generally causes a gas valve to be opened to supply gas to an associated gas burner, and a separate ignitor is triggered to ignite the gas to generate heat. One concern that arises with appliances, such as cooktops and ranges, is the risk of unintentional energization of a burner and/or unintentional heat output level changes when the burner is on. Such unintentional incidents may be caused, for example, by the user, a jumping pet, a playing child, and/or someone not aware that they bumped into or otherwise turned the associated control knob. This may occur even though typical burners usually include a two-manual-operation protocol to energize a burner (e.g., pushing and turning of the corresponding control knob).

Thus, there is a need to reduce the inadvertent operation (e.g. on, off, open, close, shift, move, etc.) of appliance controls/valves, or portions thereof, as well as to alert the user(s) or people in the surrounding area of the fact that one or more user controls have been activated, energized, or changed (whether e.g., unintentionally and/or intentionally).

SUMMARY

The herein-described embodiments address these and other problems associated with the art by utilizing a sensor (e.g., a position sensor, a flow meter, etc.) to detect and measure a rate of movement of a user control that is used to operate a cooking appliance. The rate of movement may be used in some instances to distinguish between actions that are intentionally performed with a user control as opposed to actions that are potentially unintentional in nature, e.g., as a result of a control being bumped. Detection of a potentially unintentional action in some instances may be used to alert a user and/or to prevent energization or a change in output level of a cooking element, among other responses.

Therefore, consistent with one aspect of the disclosure, in some embodiments, a cooking appliance may include a cooking element, a user control configured to control an output level of the cooking element through movement of the user control within a range of positions, a sensor to detect a rate of movement of the user control within the range of positions, and a controller coupled to the sensor and configured to determine that the rate of movement of the user control meets an alert criterion, and in response to determining that the rate of movement of the user control meets the alert criterion, selectively generate an alert for a user.

In some embodiments, the user control is a rotary control knob, and the rate of movement of the user control within the range of positions is an angular velocity of the rotary control knob detected by the sensor. In some embodiments, the controller is further configured to adjust the alert criterion based on user input. In some other embodiments, the sensor includes a position sensor, and the position sensor includes an encoder, a hall effect sensor, or a toothed wheel.

In some embodiments, the cooking element is a gas cooking element. In such embodiments, the sensor includes a flow meter, and the rate of movement of the user control within the range of positions is a rate of gas flow change detected by the flow meter. Such a cooking appliance may also include a gas valve configured to regulate a gas flow rate to the gas cooking element, and the user control is mechanically coupled to the gas valve.

In some embodiments, the controller is further configured to determine that the rate of movement of the user control meets the alert criterion when the cooking element is in an off state, and in response to determining that the rate of movement of the user control meets the alert criterion, disable energization of the cooking element. In some other embodiments, the controller is further configured to determine that the rate of movement of the user control meets the alert criterion when the cooking element is in an on state, and in response to determining that the rate of movement of the user control meets the alert criterion, disable alteration of the output level of the cooking element.

In some embodiments, the sensor is further configured to detect a direction of movement of the user control, the controller is further configured to determine that the rate of movement of the user control meets the alert criterion and the direction of movement of the user control is an output level increasing direction for the cooking element when the cooking element is in an on state, and in response to determining that the rate of movement of the user control meets the alert criterion and the direction of movement of the user control is the output level increasing direction for the cooking element, disable alteration of the output level of the cooking element. In some other embodiments, the sensor is further configured to detect a direction of movement of the user control, the controller is further configured to determine that the rate of movement of the user control meets the alert criterion and the direction of movement of the user control is an output level decreasing direction for the cooking element when the cooking element is in an on state, and in response to determining that the rate of movement of the user control meets the alert criterion and the direction of movement of the use control is the output level decreasing direction for the cooking element, allow de-energization or alteration of the output level of the cooking element in the on state.

In some embodiment, the controller is further configured to determine that the rate of movement of the user control meets the alert criterion when the cooking element is in an on state, and in response to determining that the rate of movement of the user control meets the alert criterion, keep the generated alert remaining actuated for a predetermined period of time and disable alteration of the output level of the cooking element. In such embodiments, the controller is further configured to determine whether an alert deactivation mechanism is triggered during the predetermined period of time, and in response to determining that no alert deactivation mechanism is triggered during the predetermined period of time, allow de-energization or alteration of the output level of the cooking element in the on state and keep the generated alert remaining actuated until the alert deactivation mechanism is triggered.

In some embodiments, a cooking appliance may include a plurality of cooking elements, a plurality of user controls configured to control output levels of the plurality of cooking elements through movement of each of the plurality of user controls within a range of positions, each of which having a sensor and configured to detect a rate of movement of each of the plurality of user controls within the range of positions therefor, and a controller coupled to the sensors and configured to determine that the rate of movement of one of the plurality of user controls meets an alert criterion, and in response to determining that the rate of movement of the one of the plurality of user controls meets the alert criterion, selectively generate an alert for a user.

As used herein for purposes of the present disclosure, the term "appliance" should be understood to be generally synonymous with and include any device that consumes electrical power and can be connected to an electrical circuit or battery, for example one used in a residential or commercial setting to accomplish work. The appliances referred to herein may include a plurality of electrically operated components powered by the circuit, the components operable by manipulation of control knobs or selectors. The appliances referred to herein may also include a gas supply or source and one or more gas valves for supplying gas to a burner or heating element. The appliance gas valves may be controlled by a selector or knob, either directly or indirectly, and the appliance may also include a processor or processors that operate, control and monitor the appliance and the various components and functions thereof referred to throughout this specification.

The terms "knob" or "selector" are used herein generally to describe various devices that are operatively coupled to functional components of the appliance and which may typically, but not exclusively, be operated by hand by a user. Typical control knobs and selectors include but are not limited to gas and electric burner controls, gas and electric oven controls, lighting and timing controls, start and stop controls, switches, sliders, pushbuttons, wheels, levers, and various other functional controls associated with an appliance. "Selector" may also be used to refer to a programmed button selection on a touch-screen or similar operator interface.

The term "controller" or "processor" is used herein generally to describe various apparatus relating to the operation of the system and the appliances referred to herein. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), programmable logic controllers (PLCs), and field-programmable gate arrays (FPGAs).

A processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present disclosure discussed herein. The terms "program" or "computer program" are used herein in a generic sense to refer to any type of computer code (e.g., software or microcode) that can be employed to program one or more processors or controllers.

The term "Internet" or synonymously "Internet of things" refers to the global computer network providing a variety of information and communication facilities, consisting of interconnected networks using standardized communication protocols. The appliances; controllers and processors referred to herein may be operatively connected to the Internet.

These and other advantages and features, which characterize the disclosure, are set forth in the claims annexed hereto and forming a further part hereof. However, for a better understanding of the disclosure, and of the advantages and objectives attained through its use, reference should be made to the Drawings, and to the accompanying descriptive matter, in which there is described example embodiments of the disclosure. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

In the drawings, like reference characters generally refer to the same parts throughout the different views. The drawings are not necessarily to scale. Emphasis is instead generally placed upon illustrating the principles of the disclosure, wherein;

FIG. 1 is a perspective view of a cooking appliance, in accordance with various embodiments.

FIG. 2 is a block diagram of an example control system for a cooking appliance, in accordance with various embodiments.

FIG. 7 is an enlarged front view of a rotary control knob, in accordance with various embodiments.

DETAILED DESCRIPTION

Figure 3:
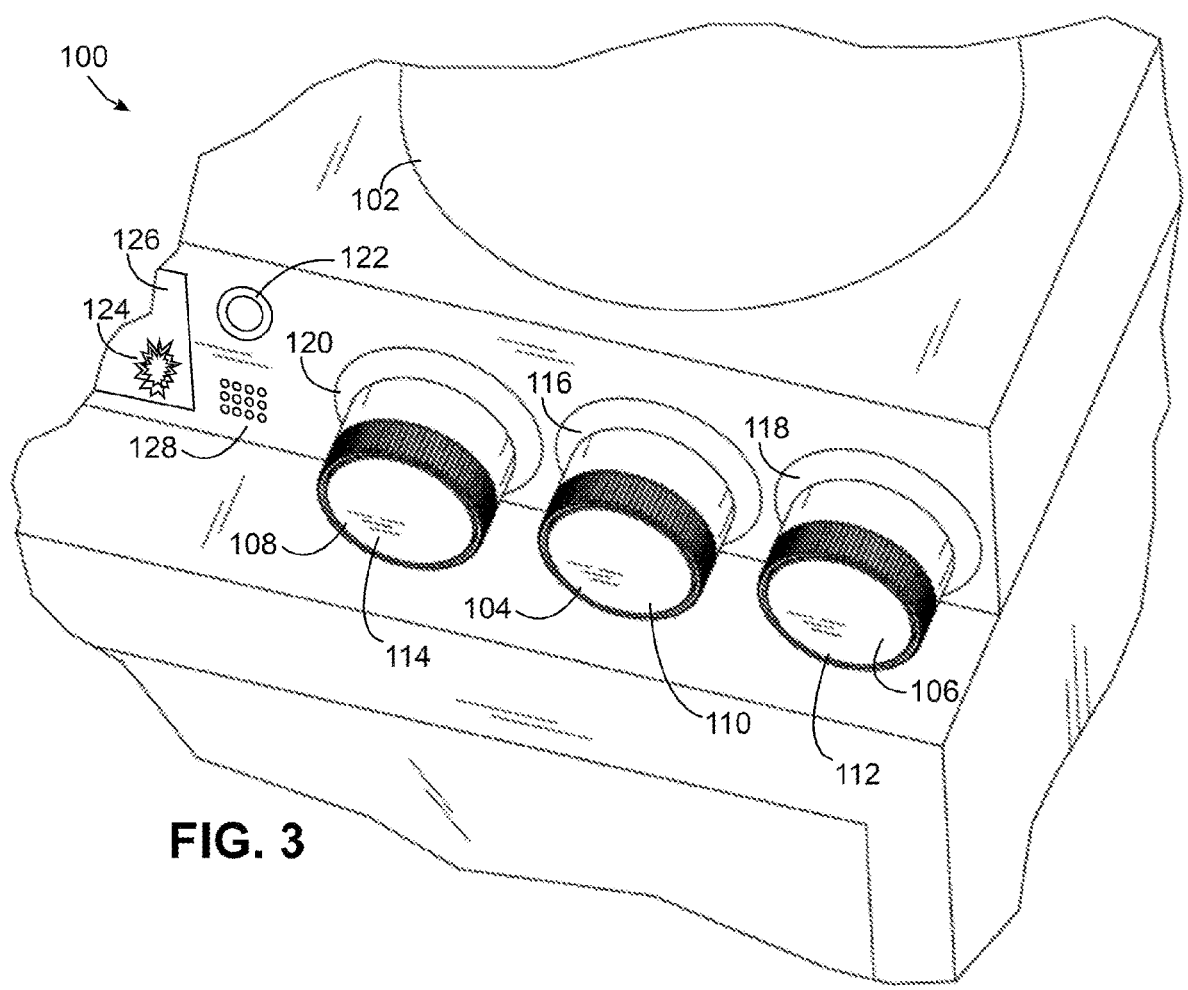
FIG. 3 is a partial perspective view of a cooking appliance implementing rotary control of mechanical valve units, in accordance with various embodiments.

The embodiments discussed hereinafter will focus on the implementation of the hereinafter-described techniques and apparatuses within a residential type cooking appliance such as a cooking appliance 10 as described below, such as the type that may be used in single-family or multi-family dwellings, or in other similar applications. However, it will be appreciated that the herein-described techniques and apparatuses may also be used in connection with other types of cooking appliances in some embodiments. For example, the herein-described techniques may be used in commercial applications in some embodiments. Moreover, the herein-described techniques may be used in connection with various cooking appliance configurations. Implementation of the herein-described techniques within gas/electric top burners, gas/electric ranges, slide-in ovens, freestanding ovens, gas/electric cooktops, gas/electric countertop ranges, etc. using a gas/electric burner or cooking surface would be well within the abilities of one of ordinary skill in the art having the benefit of the instant disclosure, so the embodiments are not limited to the residential-type range implementation discussed further herein.

Turning now to the drawings, wherein like numbers denote like parts throughout the several views, FIG. 1 illustrates an example cooking appliance 10 in which the various technologies and techniques described herein may be implemented. Cooking appliance 10 is a residential-type range, and as such includes a housing 11, a stovetop or cooktop 12 including a plurality of burners 13, and an oven 14 defining an oven or cooking cavity 15 accessed via an oven door. Cooking appliance 10 may also include a storage drawer 16 in some embodiments, or in other embodiments, may include a second oven. Various cooking elements (not shown in FIG. 1) may also be incorporated into cooking appliance 10 for cooking food in oven 14, e.g., one or more electric or gas heating elements. In some embodiments, cooktop 12 may include one or more cooking grates (not shown) thereon. The cooking grate may support a cooking vessel or cookware (not shown) over burner 13.

Cooking appliance 10 may also include various user interface devices, including, for example, control knobs 17 for controlling burners 13, a control panel 18 for controlling oven 14 and/or burner 13, and a display 19 for providing visual feedback as to the activation state of the cooking appliance. It will be appreciated that cooking appliance 10 may include various types of user controls in other embodiments, including various combinations of switches, buttons, knobs and/or sliders, typically disposed at the rear or front (or both) of the cooking appliance. Further, in some embodiments, one or more touch screens may be employed for interaction with a user. As such, in some embodiments, display 19 may be touch sensitive to receive user input in addition to displaying status information and/or otherwise interacting with a user. In other embodiments, cooking appliance 10 may be controllable remotely, e.g., via a smartphone, tablet, personal digital assistant or other networked computing device, e.g., using a web interface or a dedicated app.

Display 19 may also vary in different embodiments, and may include individual indicators, segmented alphanumeric displays, and/or dot matrix displays, and may be based on various types of display technologies, including LEDs, vacuum fluorescent displays, incandescent lights, etc. Further, in some embodiments audio feedback may be provided to a user via one or more speakers, and in some embodiments, user input may be received via a spoken or gesture-based interface.

As noted above, cooking appliance 10 of FIG. 1 may be a range, which combines both a stovetop and one or more ovens, and which in some embodiments may be a standalone or drop-in type of range. In other embodiments, however, cooking appliance 10 may be another type of cooking appliance, e.g., a cooktop without a separate oven. In general, a cooking appliance consistent with the disclosure may be considered to include any residential-type appliance including a housing and one or more cooking elements disposed therein and configured to generate energy for cooking food on a cooktop and/or within one or more oven cavities.

In turn, a cooking element may be considered to include practically any type of energy-producing element used in residential applications in connection with cooking food, e.g., employing various cooking technologies such as electric, gas, light, microwaves, induction, convection, radiation, etc. In the case of an oven, for example, one or more cooking elements therein may be gas, electric, light, or microwave heating elements in some embodiments, while in the case of a stovetop, one or more cooking elements therein may be gas, electric, or inductive heating elements in some embodiments. Further, it will be appreciated that any number of cooking elements may be provided in a cooking appliance (including multiple cooking elements for performing different types of cooking cycles such as baking or broiling), and that multiple types of cooking elements may be combined in some embodiments, e.g., combinations of microwave and light cooking elements in some oven embodiments.

A cooking appliance consistent with the disclosure also generally includes one or more controllers configured to control the cooking elements and otherwise perform cooking operations at the direction of a user. FIG. 2, for example, illustrates an example embodiment of a cooking appliance 40 including a controller 42 that receives inputs from a number of components and drives a number of components in response thereto. Controller 42 may, for example, include one or more processors 44 and a memory 46 within which may be stored program code for execution by the one or more processors. The memory may be embedded in controller 42, but may also be considered to include volatile and/or non-volatile memories, cache memories, flash memories, programmable read-only memories, read-only memories, etc., as well as memory storage physically located elsewhere from controller 42, e.g., in a mass storage device or on a remote computer interfaced with controller 42. The processor 44 may be any hardware device capable of executing instructions stored in memory 46 or otherwise processing data. As such, the processor may include a microprocessor, field programmable gate array (FPGA), application-specific integrated circuit (ASIC), or other similar devices. The memory 46 may include various memories such as, for example L1, L2, or L3 cache or system memory. As such, the memory 46 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

As shown in FIG. 2, controller 42 may be interfaced with various components, including various cooking elements 48 used for cooking food (e.g., various combinations of gas, electric, inductive, light, microwave, light cooking elements, among others), one or more user controls 50 for receiving user input (e.g., various combinations of switches, knobs, buttons, sliders, touchscreens or touch-sensitive displays, microphones or audio input devices, image capture devices, etc.), and a user display 52 (including various indicators, graphical displays, textual displays, speakers, etc.), as well as various additional components suitable for use in a cooking appliance, e.g., lighting 54 and/or one or more fans (e.g., convection fans, cooling fans, etc.), among others.

Controller 42 may also be interfaced with various sensors 58 located to sense environmental conditions inside of and/or external to cooking appliance 40, e.g., one or more temperature sensors, humidity sensors, air quality sensors, smoke sensors, carbon monoxide sensors, odor sensors and/or electronic nose sensors, among others. Such sensors may be internal or external to cooking appliance 40, and may be coupled wirelessly to controller 42 in some embodiments. Sensors 58 may include, for example, one or more temperature sensors for sensing an air temperature within an oven cavity.

In some embodiments, controller 42 may also be coupled to one or more network interfaces 60, e.g., for interfacing with external devices via wired and/or wireless networks such as Ethernet, Wi-Fi, Bluetooth, NFC, cellular and other suitable networks, collectively represented in FIG. 2 at 62. Network 62 may incorporate in some embodiments a home automation network, and various communication protocols may be supported, including various types of home automation communication protocols. In other embodiments, other wireless protocols, e.g., Wi-Fi or Bluetooth, may be used. In some embodiments, cooking appliance 40 may be interfaced with one or more user devices 64 over network 62, e.g., computers, tablets, smart phones, wearable devices, etc., and through which cooking appliance 40 may be controlled and/or cooking appliance 40 may provide user feedback. For example, network interface 60 may include a network interface card (NIC) configured to communicate according to the Ethernet protocol. Additionally, network interfaces 60 may implement a TCP/IP stack for communication according to the TCP/IP protocols. Various alternative or additional hardware or configurations for network interface 60 will be apparent to one of ordinary skill in the art.

In some embodiments, one or more sensors 58 coupled to controller 42 may be position sensors configured to detect position statuses of user control 50. In some embodiments, user control 50 may be mounted to or secured to position sensor 58 such as an encoder, potentiometer, or equivalent signal generator that provides and is operatively coupled to controller 42 representative of the position of user control 50 when user control 50 is moved. In some embodiments, position sensor 58 may be one or more position switches that sense whether user control 50 is at a certain position and/or within a certain range instead of sensing the exact angular position of user control 50 like an encoder. For example, a cam system may engage position sensor 58 to signal the position status whenever the user control 50 is within an energized range. In some embodiments of gas cooking appliances, a flow meter 56 may also be coupled to controller 42 and configured to measure a gas flow rate and/or a rate of gas flow change when user control 50 is shifted.

In some embodiments, controller 42 may be interfaced with one or more alarms 59 to signal an alert regarding various conditions of cooking appliance 40 (e.g., energization/de-energization conditions inside of and/or external to cooking appliance 40). For example, alarm 59 may alert or communicate to the user and/or a device concurrently with a cooking element has been energized (e.g., unintentionally and/or intentionally activated from off position to on position). Alarm 59 may be a variety of signals and/or warnings (e.g., audible/acoustic, visual, light, display message, user interface, haptic alert, or a combination thereof) directed to one or more users or to one or more devices (e.g., appliances, mobile device, cooking appliance, etc.). Alarm 59 may alert continually until deactivated by the user and/or a certain predetermined parameter/condition of appliance 40/controller 42 is met. Such alarm 59 may be internal or external to cooking appliance 40 and coupled wirelessly to controller 42 in some embodiments.

In some embodiments, controller 42 may operate under the control of an operating system and may execute or otherwise rely upon various computer software applications, components, programs, objects, modules, data structures, etc. In addition, controller 42 may also incorporate hardware logic to implement some or all of the functionality disclosed herein. Further, in some embodiments, the sequences of operations performed by controller 42 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the disclosure applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the disclosure is not limited to the particular sequences of operations described herein.

Numerous variations and modifications to the cooking appliances illustrated in FIGS. 1-2 will be apparent to one of ordinary skill in the art, as will become apparent from the description below. Therefore, the disclosure is not limited to the specific implementations discussed herein.

As noted above, one challenge associated with the operation of cooking appliances is the inadvertent operation of user controls. Embodiments consistent with the disclosure address this challenge in part by controlling a cooking appliance in response to a rate of movement of a user control detected by a sensor, and a controller coupled to the sensor and configured to determine that whether the rate of movement of the user control meets an alert criterion or not. In response to determining that the rate of movement of the user control meets the alert criterion, the controller may be configured to selectively generate an alert for a user. For example, in some embodiments, when a position sensor detects a control knob/slider being moved faster than the alert criterion, which usually indicates an inadvertent operation of the control knob/slider, an alert may be triggered to warn the user for the movement. In addition, as will become more apparent below, support may also be provided to prevent energization or a change in output level of a cooking element in some embodiments.

Figure 4:
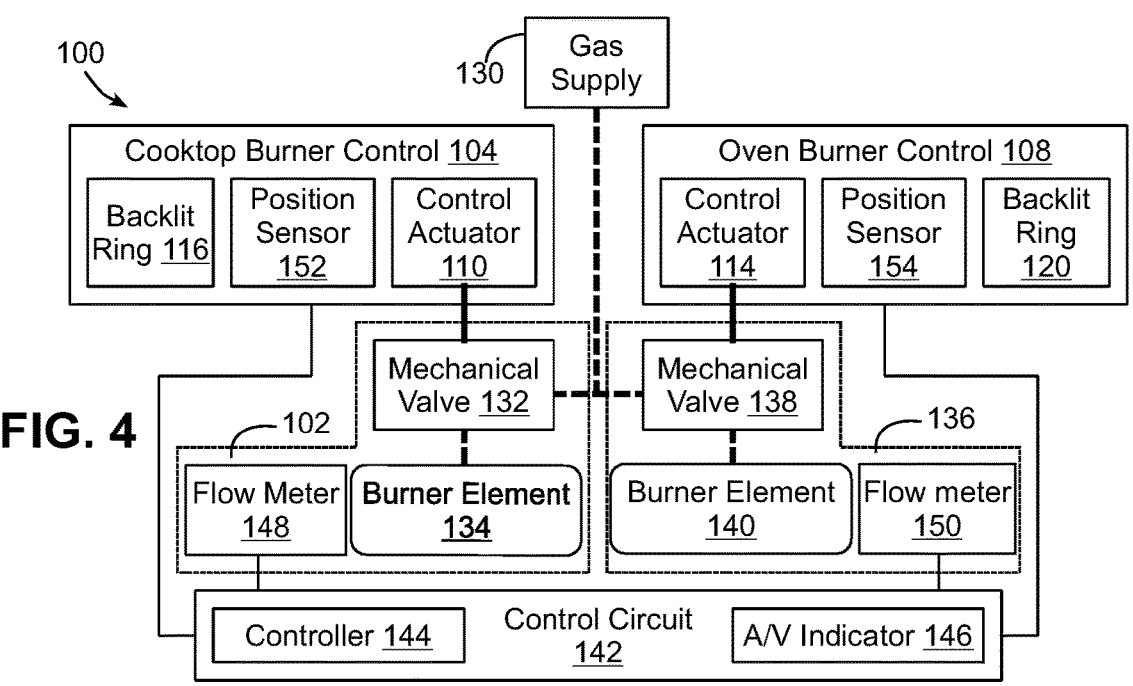
FIG. 4 is a block diagram of an example control system for the cooking appliance of FIG. 3.

In some embodiments, and as illustrated in FIGS. 3-4, a gas burner may be controlled by a mechanical valve that is mechanically coupled to a control actuator such as a knob or slider. FIG. 3, in particular, illustrates a gas range 100 including a gas cooktop burner 102 and a set of burner controls 104, 106, 108, e.g., rotary burner controls, each with a control actuator 110, 112, 114, e.g., a rotary control actuator or knob. In some embodiments, one or more of burner controls 104, 106, 108 may be used to control an oven, rather than a cooktop. In the embodiment discussed below, for example, burner control 104 is used to control gas cooktop burner 102 while burner control 108 is used to control a gas oven burner.

As noted above, embodiments consistent with the disclosure may generate one or more of several different types of indications to a user in response to determining that a rate of movement of a user control meets an alert criterion. In order to generate indications to a user, gas range 100 may include various types of electrical indicator devices, e.g., an illuminated light or LED-backlit ring 116, 118, 120 on each burner control 104, 106, 108, a separate, dedicated visual indicator such as an LED 122 on the control panel, an illuminated icon 124 and/or text displayed on a user interface 126, or a speaker 128 for use in generating audible indications. An indication could also be generated proximate the burner itself, e.g., using a light source positioned close to the burner, or on a related device, such as an overhead range hood or microwave oven. An indication, in this regard, may be considered to include any type of visual and/or audible presentation to a user that may be recognized as an alert by a user, and in some instances, an indication may be generated on a device that is remove from a cooking appliance, e.g., on an interconnected smart home device, mobile device, etc. It will also be appreciated that the various indications 116, 118, 120, 122, 124 and 128 illustrated in FIG. 3 are merely shown on a single device for illustrative purposes, and that a cooking appliance consistent with the disclosure may utilize as few as one such indicating device, indicator, illumination source, speaker, etc. in some embodiments.

In addition, it will be appreciated that indications may be generated using devices that may also be used to indicate other status information for a cooking appliance, and that indications in some embodiments may utilize different colors, animations, patterns, text, graphical images, etc. In one example embodiment, ignition-related indications may be implemented by light rings 116, 118, 120, and that additional indications associated with the respective user controls 104, 106, 108 may also be generated using the same light rings 116, 118, 120. For example, a light ring 116, 118, 120 may be used to display a first color or pattern (e.g., a red color and/or a flashing or chasing lights pattern) to represent when a user control has been inadvertently moved, and then display a second color or pattern (e.g., a blue color and/or a solid illumination pattern) to represent when the control actuator 110, 112, 114 is in an "on" position and a flame is detected. Further indications, e.g., related to flame loss or other error conditions, may also be displayed in a similar manner.

With further reference to FIG. 4, gas burner 102 may be coupled to a gas supply 130 through a mechanical valve 132 that regulates the flow of gas to a burner element 134, e.g., via a mechanical coupling to control actuator 110 of cooktop burner control 104. Similar valves and burner elements may be used for the other cooktop burners of appliance 100, but are omitted from FIG. 4 for clarity. In addition, where a gas oven is incorporated into cooking appliance 100, one or more gas oven burners 136, each including an associated mechanical valve 138 and burner element 140, may also be used. As illustrated in FIG. 4, mechanical valve 138 is mechanically coupled to control actuator 114 of oven burner control 108.

Control over cooking appliance 100 may be provided by a control circuit 142, which may include a controller 144 in some embodiments. Control circuit 142 may drive one or more audible and/or visual indicators 146 (which may correspond, for example, to any of elements 122, 124 or 128 of FIG. 3) as well as various light rings 116, 120 of burner controls 104, 108. Control circuit 142 may be also coupled to one or more gas flow meters 148, 150, which may be configured to measure a gas flow rate and/or a rate of gas flow change when the user control is shifted.

Further, in some embodiments, each burner control 104, 108 may include an associated position sensor 152, 154 that is used to detect a position of the associated control actuator 110, 114. Each position sensor 152, 154 may be implemented using practically any type of sensor capable of detecting an absolute position and/or relative movement of the rotary control actuator, e.g., an encoder, one or more micro-switches, etc. While in some embodiments, a position sensor 152, 154 may have a resolution sufficient to indicate a specific position, in other embodiments a position sensor may only be sufficient to indicate when the control actuator is within a larger range of positions, e.g., in the case of a cam-driven switch that is activated throughout a relatively large range of positions of a control actuator.

Figure 5:
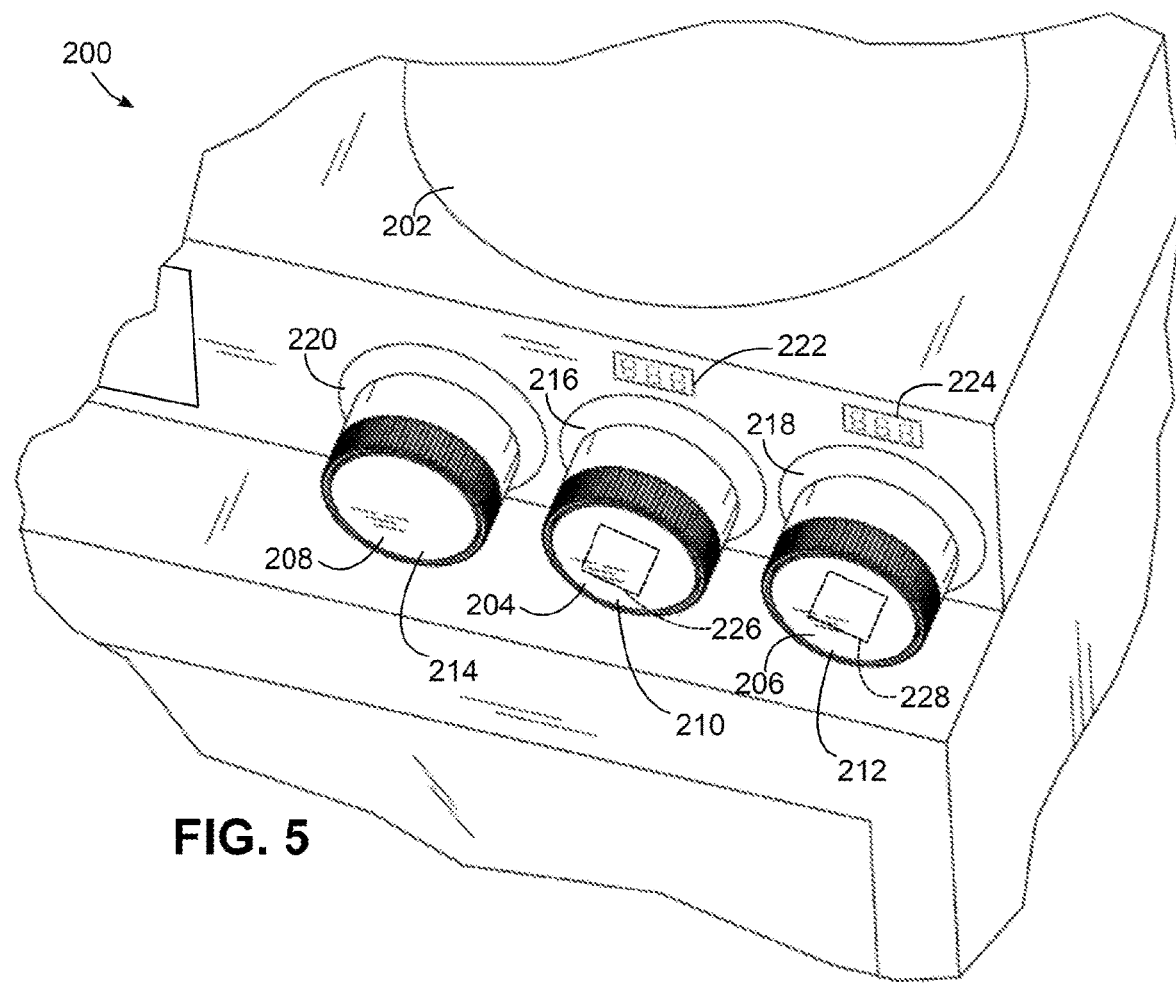
FIG. 5 is a partial perspective view of a cooking appliance implementing rotary control of electromechanical valve units, in accordance with various embodiments.

As noted above, cooking appliance 100 relies on mechanical gas valves that are mechanically coupled to burner controls. In other embodiments, however, burner controls may be coupled electronically, rather than mechanically, to electromechanical valves for the purpose of controlling a gas burner. FIG. 5, in particular, illustrates a cooking appliance 200 including a gas cooktop burner 202 and several burner controls 204, 206, 208, each with an associated control actuator 210, 212, 214 and light ring 216, 218, 220. In this embodiment, burner controls 204, 206 are used for cooktop burners and include associated user interfaces or displays 222, 224, while burner control 208 is used for an oven burner. Furthermore, at least burner controls 204, 206 include associated secondary controls 226, 228, which may be implemented as switches or touch sensors configured to detect an axial force applied to the associated control actuator 210, 212 and generate an actuation signal in response thereto, e.g., for turning a gas burner on or off or performing other user inputs, or in response to determining that a rate of movement of a user control meets an alert criterion, which will be discussed in greater detail below.

Figure 6:
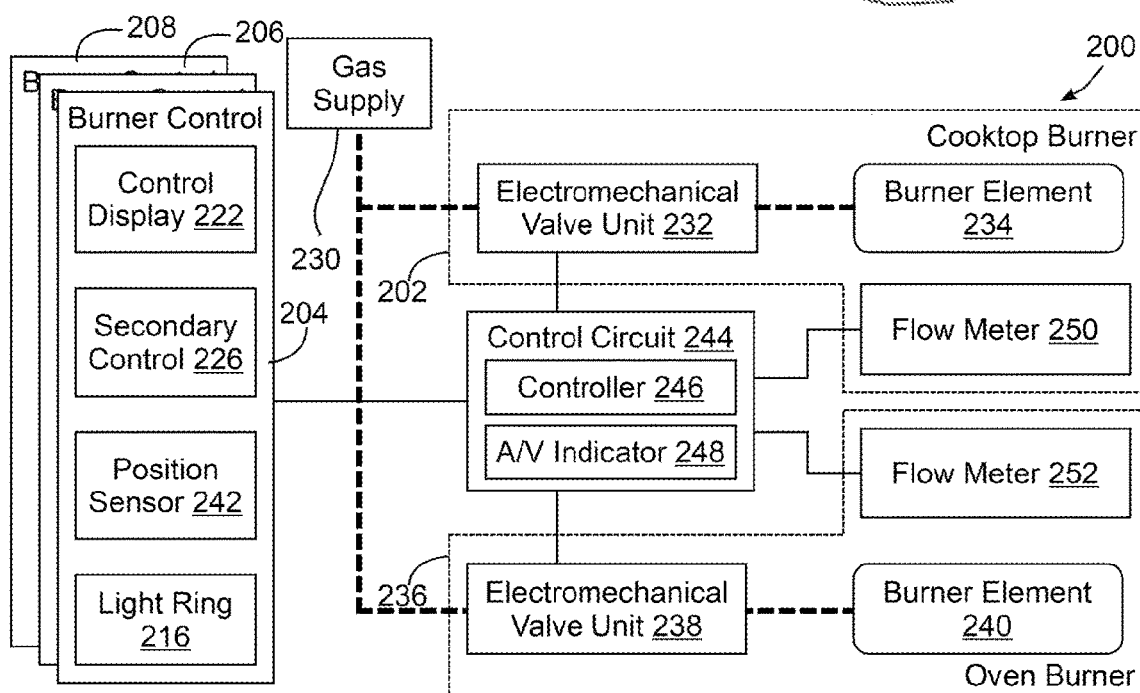
FIG. 6 is a block diagram of an example control system for the cooking appliance of FIG. 5.

With further reference to FIG. 6, gas burner 202 may be coupled to a gas supply 230 through an electromechanical valve 232 that regulates the flow of gas to a burner element 234. Similar valves and burner elements may be used for the other cooktop burners of appliance 200, but are omitted from FIG. 4 for clarity. In addition, where a gas oven is incorporated into cooking appliance 200, one or more gas oven burners 236, each including an associated electromechanical valve unit 238 and burner element 240, may also be used. An electromechanical valve unit, in this regard, may include any number of different valves and/or valve combinations that regulated the flow of gas to a gas burner in response to electronic control, e.g., an on/off or proportional valve controlled by a stepper motor, an electrically-controlled proportional valve (e.g., a normally-closed current controlled proportional valve), a parallel arrangement of discrete on/off valves having differing flow rates, or other valve designs and/or combinations of valves as will be appreciated by those of ordinary skill having the benefit of the instant disclosure.

Each burner control, e.g., burner control 110, generally includes, in addition to a control actuator, an electronic burner control user interface or display 222, light ring 216, and secondary control 226. In addition, each burner control may also include a position sensor 242, which in the illustrated embodiment is implemented as an encoder such as an A-quad-B encoder, but could also be implemented using other encoders or switches. In some embodiments, each burner control may be a rotary burner control, and may include a rotary control actuator such as a knob, ring or wheel. In the illustrated embodiment, the rotary knob may be a continuous rotary knob that is infinitely rotary in both directions, while in other embodiments the knob may be rotary only within a limited range.

An electronic burner control user interface or display may also be implemented in a number of manners in different embodiments. In the illustrated embodiment, for example, each electronic burner control user interface or display may be implemented using a multi-segment, multi-digit LED display. In other embodiments, however, such a user interface or display may be positioned in other locations adjacent the rotary control actuator, or even on the rotary control actuator itself. In some embodiments, e.g., where a rotary control actuator is a ring or wheel, such a user interface or display may be positioned on a stationary front or side surface proximate or on the rotary control actuator. In addition, the user interface or display is generally dedicated to a particular burner and rotary burner control such that the user interface or display only displays status information related to that burner and rotary burner control, e.g., a current output power level of the burner (e.g., a numerical value or label such as 0-10, a percent, a descriptor such as "low," "medium," or "high,", etc.). In other embodiments, however, other user interface technologies may be used, e.g., using dot-matrix panels, LED or LCD panels, vacuum fluorescent displays, discrete illumination sources, etc. Furthermore, user interfaces or displays may support multiple burners and rotary burner controls in some embodiments, e.g., to display status information for multiple burners having closely-positioned rotary burner controls. In still other embodiments, a single user interface or display may be used for all gas and/or cooktop burners.

Each light ring 216 may be implemented using one or more LED indicators that illuminate various portions of the burner control, and that in some embodiments may also convey additional status information, e.g., a rotary position indicator, a color or animation representing on/off status, hot burner status, and in some embodiments, alerts associated with inadvertent movement of the burner control. In other embodiments, no illumination may be supported, so backlit ring 216 may be omitted.

Each secondary control 226 may be used to provide a secondary source of user input to supplement the rotary input received via rotation of the control actuator, e.g., to activate or deactivate the gas burner, to ignite the gas burner, or provide other user input. The secondary control 226 may be implemented using a touch sensor, a mechanical or magnetic switch on rotary control actuator, a mechanical or magnetic switch capable sensing axial movement of the control actuator itself, or any other sensor capable of sensing an axial force applied generally along the axis of rotation of the rotary control actuator. In other embodiments, a secondary control may be implemented separately from a control actuator (e.g., adjacent thereto on the control panel) or may be omitted entirely.

Each position sensor 242 may be implemented using practically any type of sensor capable of detecting an absolute position and/or relative movement of the rotary control actuator, e.g., an encoder, one or more microswitches, etc. In one embodiment, an A-quad-B encoder may be used to indicate both a direction and extent of relative rotation of the rotary control actuator, as well as to sense the rate of rotation of the rotary control actuator.

Control over appliance 200 may be provided by a control circuit 244, which in some embodiments may include a controller 246, one or more audible and/or visual indicators 248, and one or more flow meters 250, 252 for implementing gas flow measurement functionality. Controller 246 in the illustrated embodiment may be used to execute instructions that implement software-based control over appliance 200; however, it will be appreciated that various aspects of the disclosure described herein may be implemented in control circuits lacking any controllers or other software-based functionality, so the disclosure is not limited to software-based controls and the like.

Various features may be achieved with the hardware system as describer above. In some embodiments, an alert for a user may be generated when an unintentional movement of the user control is detected, and the unintentional movement of the user control is detected by a sensor and determined by a controller if a rate of movement of the user control meets an alert criterion. In some embodiments, the rate of movement of the user control may be a velocity/speed of movement of the user control. For example, as best shown in FIG. 7, a rotary control knob 20 may incorporate a position sensor (e.g., a rotary encoder not shown here) for detecting the knob's position and measuring a rate of movement (e.g., an angular velocity) of control knob 20. When a knob rotation is detected as indicated by the arrow in a counterclockwise direction as shown, a current velocity V is measured and compared with an established alert criterion velocity $V_c$. As a rotation velocity being equal to or faster than the alert criterion velocity $V_c$ may be determined by the controller as unintentional, the controller may continuously verify that V is smaller than $V_c$ to detect unintentional rotations. Accordingly, an alert may be generated when the current velocity V meets (e.g., has a value that is larger or equal to) the alert criterion velocity $V_c$ to alert the user or other people in the surrounding area of the fact that one or more user controls have been activated, energized, or changed. In some embodiments, the alert criterion, such as the alert criterion velocity $V_c$, may be programmed and adjusted by the user according to preference. In such a manner, any bumping or impacts that would change the knob's position faster than the established and adjustable criterion velocity $V_c$, which may happen when control knob 20 is unintentionally moved (e.g., by a jumping pet or a playing child), may be recognized by the controller of the cooking appliance as unintentional and an alert may be generated.

It will be appreciated that control knob 20 described above may be a variety of constructions, quantities, shapes, sizes, and positions disposed on cooking appliances. In some embodiments, control knob 20 may be implemented as another type of rotary and/or variable control, and thus which may also be referred to herein as control knob 20, though the disclosure is not limited to the use of a rotary or variable control for control knob 20. Other configurations, e.g., sliders, combinations of buttons or switches assigning different output levels, or other controls or combinations of controls capable of selecting from among a plurality of output levels for a particular burner or group of burners assigned thereto at a particular time may be used for control knob 20 in other embodiments. It will be appreciated that additional controls and/or knobs may be utilized in cooking appliances in addition to control knob 20. In some embodiments, instead of a rotary encoder, a hall effect sensor and toothed wheel may also be used to detect the rate of movement of the control knob 20.

In some embodiments of gas cooking appliances such as appliances 100, 200, a flow meter may be used instead of a position sensor to detect and measure a rapid change of a gas flow rate, which may indicate a rapid change in the user control position. In such embodiments, the rate of movement of the user control may be a rate of gas flow change. For example, a gas cooking appliance may incorporate a flow meter to detect and measure a rate of gas flow change corresponding to the position changes of control knob 20.

When control knob 20 is opened or moved as indicated by the arrow in a counterclockwise direction as shown, the position of the associated gas valve is changed, and a current rate of gas flow change R is measured by the flow meter and compared with an established alert criterion rate $R_c$. As a rate of gas flow change being equal to or larger than the alert criterion rate $R_c$ may be determined by the controller as unintentional, the controller may continuously verify that R is smaller than $R_c$ to detect unintentional rotations. Accordingly, an alert may be generated when the current rate of gas flow change R meets (e.g., has a value that is larger or equal to) the alert criterion rate $R_c$ to alert the user or other people in the surrounding area of the fact that one or more user controls have been activated, energized, or changed. In some embodiments, the criterion rate $R_c$ may be programmed and adjusted by the user according to their preference.

It will be appreciated that the position sensor and/or flow meter described above may be a variety of constructions, quantities, shapes, sizes, and positions disposed on cooking appliances, and they are not mutually exclusive to each other (e.g., a system may include both the position sensor and the flow meter to detect the unintentional movement of the user control). In some embodiments, there may be only one flow meter connected on the main gas supply line for detecting and measuring the rate of gas flow change. In some other embodiments, there may be separate flow meters corresponding to each user control on each gas supply branch line.

In addition, in some embodiments the current cooking state may also be used in the aforementioned alert detection algorithms, e.g., such that an inadvertent movement of the user control has been detected such that it can also be determined that active cooking is in progress, certain features may be achieved. For example, in some embodiments, besides generating alerts, the controller of cooking appliance may also be configured to, in response to determining that the rate of movement of the user control meets the alert criterion, disable the energization of a cooking element when the cooking element is off or disable alteration of the output level of the cooking element when the cooking element is on. In such embodiments, an inadvertent operation of the use control may be detected not only when the cooking element is accidentally turned on, but also when the cooking element is already on and bumped to significantly change the output level due to the rapid change of a user control when the cooking element is in an energized position. It will be appreciated that for gas cooking systems, e.g., manual gas systems, the igniter may still be allowed to operate to lite the gas flow with an unintentional movement of the user control, while the alert may be persistent until deactivated by the user. In digital gas systems, on the other hand, energization of the cooking element may be disabled. In some embodiments of electrical systems, a cooking element may still be energized with an unintentional movement of the user control, while the alert may be persistent until deactivated by the user. In addition, it will be appreciated that different alert criteria may be used based on whether or not a burner is energized, e.g., so the threshold for triggering an alert when a burner is energized higher than a threshold when the burner is off.

In some embodiments, when the cooking element is determined to be on, the sensor integrated with the user control may be further configured to detect a direction of movement of the user control, such that, in some embodiments, an alert may be generated and/or a user action may be ignored when the user control is moved in one direction, but when the user control is moved in the opposite direction, no alert is generated and/or the user action is accepted regardless of the rate of movement. As shown in FIG. 7, a cooking process of a gas cooking appliance may be performed by rotating control knob 20 counter-clockwise from "OFF" position to an "LITE" position to activate an igniter to create sparks to ignite the gas flow. It will be appreciated that the illustration in FIG. 7 is not limited, and control knob 20 for may be rotated in either direction (i.e., clockwise for ignition) in other embodiments. If the ignition process is successful, the associated cooking element is lit, and then the user may continue rotating control knob 20 to a position within a range of positions corresponding to a gas valve position for a desired gas flow rate and corresponding output level of the cooking element. Accordingly, when the cooking element is on, the sensor integrated with control knob 20 may be configured to detect whether control knob 20 is rotating in an output level increasing direction of the output level for the cooking element (e.g., counter-clockwise or clockwise) or an output level decreasing direction for the cooking element (e.g., clockwise or counter-clockwise). In such embodiments, the controller may be further configured to disable alteration of the output level of the cooking element when the rate of movement of the user control meets the alert criterion and the direction of movement of the user control is the output level increasing direction for the cooking element. However, when the rate of movement of the user control meets the alert criterion and the direction of movement of the user control is detected to be the output level decreasing direction for the cooking element, the controller may be configured to accept the alteration instead of preventing the alteration (e.g., decrease) of the output level of the cooking element. In such a manner, the user's ability of turning off/down the cooking element is not hindered even if the rate of movement of the user control meets the alert criterion, which may happen while a user is trying to turn off/down a burner quickly. It will be appreciated that various sensors may be used to detect the direction of movement of the user control. For example, the controller may decide the direction of movement of the user control directly through position input (e.g., from a position sensor) or indirectly through other types of sensor input. For example, an increasing flow rate detected by a flow meter may indicate the output level increasing direction for the cooking element, and vice versa.

Besides an audible sound alert, in some embodiments, the alert may be a haptic alert (e.g., a vibration on the user control). In some embodiments, the alert may be a visual alert (e.g., flashing lights through indicators on the user control) In some embodiments, the alert may be time delayed by a timer or time span (e.g., one second, two seconds, etc.) from the time of unintentional movement of the user control is detected to avoid nuisance alerts. For example, with a delay, the alert may not be activated when someone (e.g., a user) bumps the user control inadvertently and immediately moves the user control back to the off position.

When the alert has been triggered under different scenarios as noted above, the user may deactivate the alert in different manners. For example, in some embodiments, deactivation of the alert may be in response to the user control being moved back to the off position. In some other embodiments, activating a button, switch, or a sensor may deactivate the alert. Alternatively or in addition to the herein described actions, a variety of other user actions or appliance conditions may deactivate the alert.

In some embodiments, when the cooking element is determined to be on and the rate of movement of the user control meets the alert criterion, the controller may be configured to keep the generated alert remaining actuated for an adjustable predetermined period of time (e.g., 15 seconds) and also disable the alteration of the output level of the cooking element simultaneously. During the predetermined period of time, the user may use an alert deactivation mechanism as described above to deactivate the generated alert. If no alert deactivation mechanism was detected, the cooking element may be turned off and the generated alert may persist until the user takes an action to stop the alert. In some embodiments, controller 42 may set a timer (e.g. software or hardware timer) to track a time span or the predetermined period of time. The predetermined period of time may be a variety of amounts and/or be defined by the user in various embodiments. For example, when an alert is generated, the controller may be configured to start the timer, and to determine whether an alert deactivation mechanism is provided by the user or not, within the predetermined period of time based upon the current value of the timer and when the alert is generated.

Figure 8:
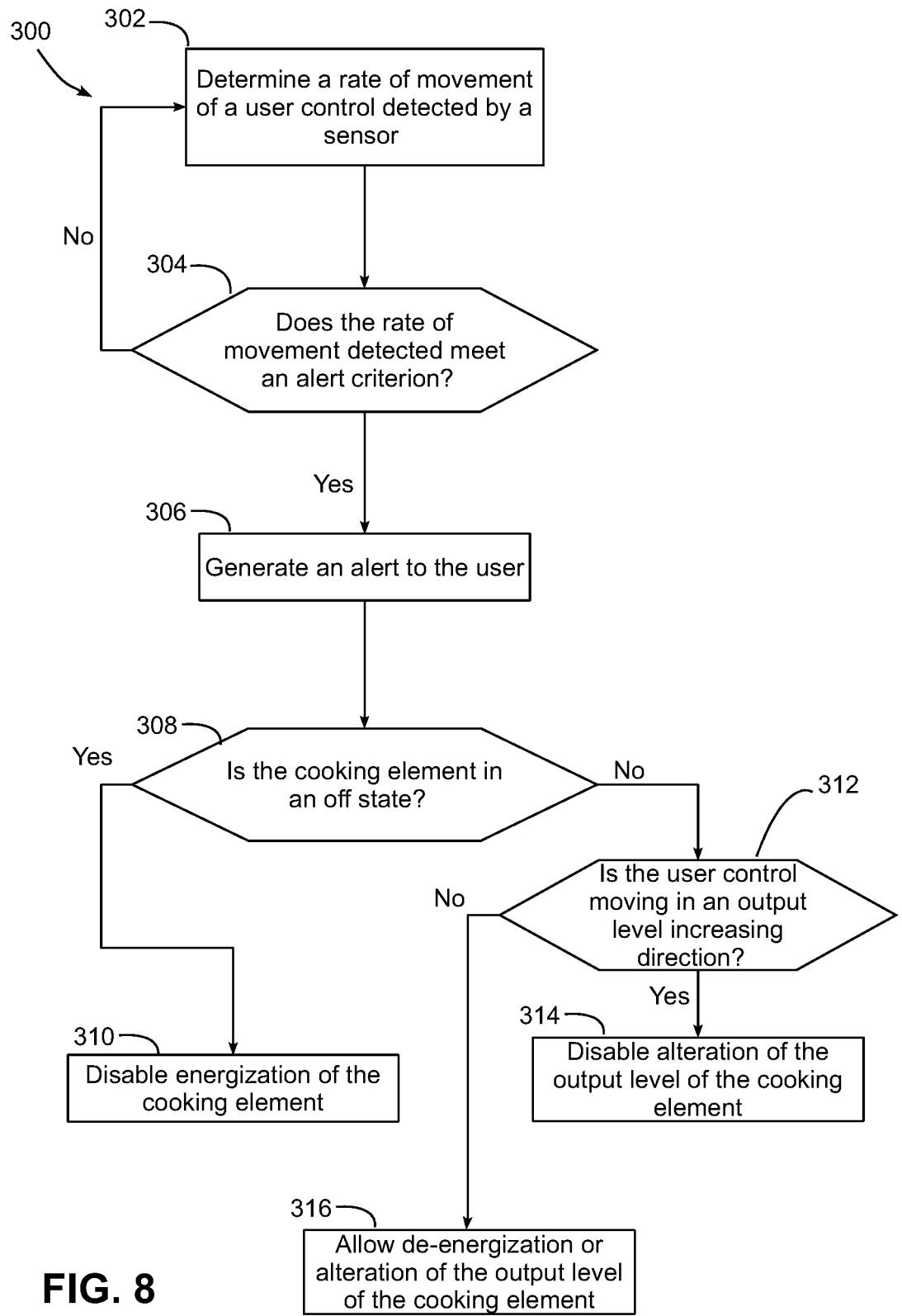
FIGS. 8 and 9 are flowcharts illustrating example control sequences of operations for cooking appliances, in accordance with various embodiments.
Figure 9:
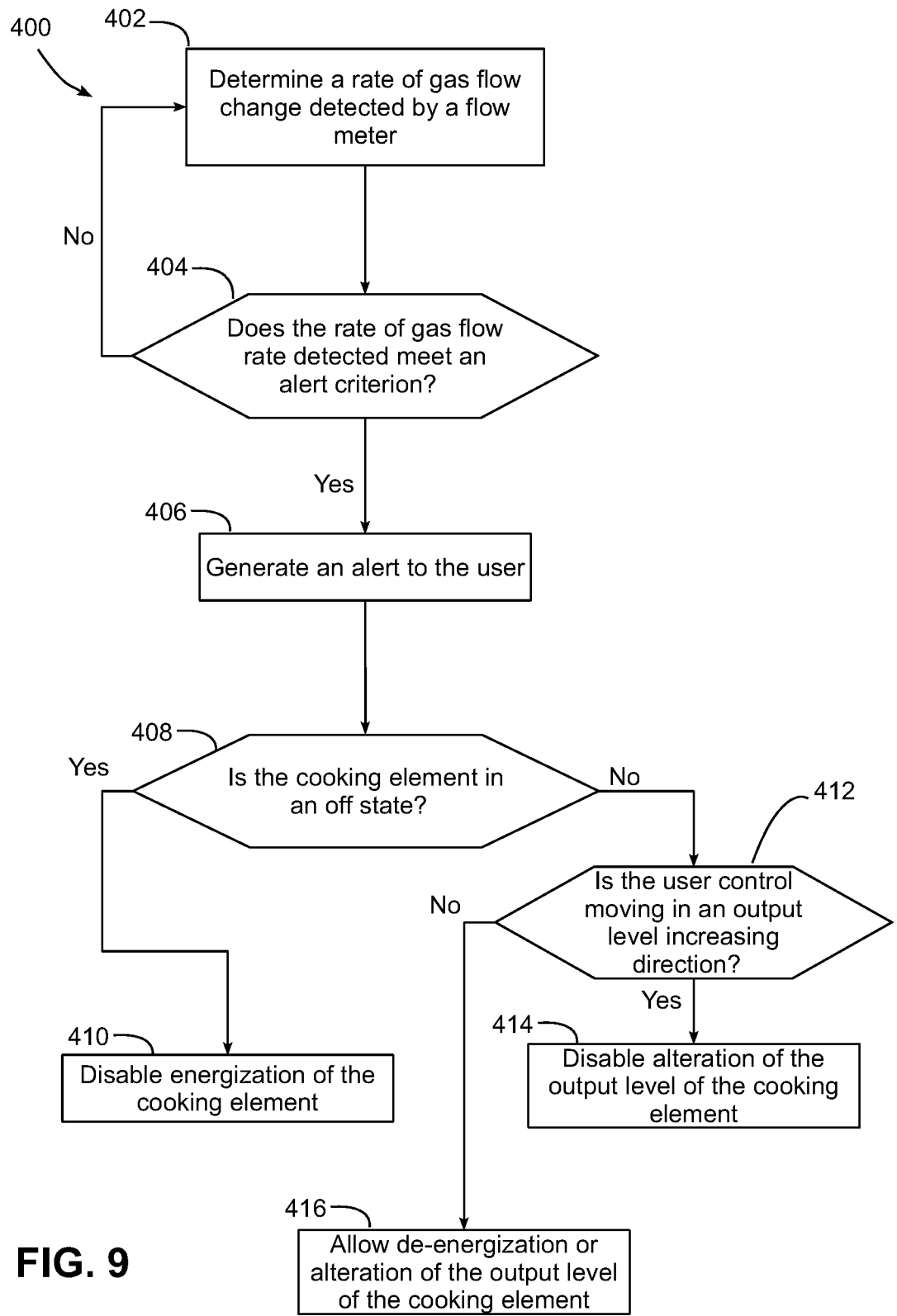

Now turning to FIGS. 8 and 9, these figures illustrate various sequences of operations for performing desired functions by measuring a rate of movement of a user control consistent with some embodiments of the disclosure. As shown in FIG. 8, a sequence 300 begins in block 302 by determining a rate of movement of a user control detected by a sensor, e.g., by detecting an angular velocity of a rotary control knob 20 through an integrated position sensor. Next, in block 304, based on the input from the sensor, if the rate of movement of the user control meets an alert criterion, an alert may be generated to remind the user in block 306. If the rate of movement of the user control does not meet the alert criterion, block 304 passes control back to block 302 to restart the sequence 300. In some embodiments, if the corresponding cooking element is determined to be in an off state in block 308, the energization of the cooking element may be optionally disabled in block 310 following the alert in block 306. If the corresponding cooking element is determined to be in an on state in block 308, block 312 may further determine whether the user control is moving in an output level increasing direction for the cooking element or not, and the alteration of the output level of the cooking element may be optionally disabled in block 314 if the user control is moving in the increasing direction. If the user control is detected to be moving in an output level decreasing direction, block 312 passes control to block 316 to accept the user input, e.g., by de-energizing or altering the output level of the corresponding cooking element.

In some other embodiments as shown in FIG. 9, an operation sequence 400 may be used for gas systems to generate alerts during operation. The sequence 400 starts in block 402 by determining a rate of gas flow change detected by a flow meter. Then, if the determination in block 404 determines that the rate of gas flow change meets an alert criterion, an alert may be generated in block 406. If the above determination in block 404 is not satisfied, block 404 passes control back to block 402 to restart the sequence 400. Similar to the sequence 300, if the cooking element is detected to be off in block 408, the energization of the cooking element may be optionally disabled in block 410 following the alert in block 406. If the corresponding cooking element is detected to be on in block 408, the alteration of the output level of the cooking element may be optionally disabled in block 414 if the user control is also determined to be moving in an output level increasing direction in block 412. If the user control is moving in an output level decreasing direction, block 412 passes control to block 416 to accept the user input, e.g., by de-energizing or altering the output level of the corresponding cooking element.

It will be appreciated that the various features described in FIGS. 8 and 9 may be implemented separately in a cooking appliance design in some embodiments, while in other embodiments, multiple of such features may be implemented in the same cooking appliance design. Further, the logic used to implement such features may be combined in some embodiments such that multiple features are monitored by the same logic.

While a variety of inventive embodiments have been described and illustrated herein, those of ordinary skill in the art will understand that a variety of other methods, systems, and/or structures for performing the function and/or obtaining the results, and/or one or more of the advantages described herein are possible, and further understand that each of such variations and/or modifications is within the scope of the inventive embodiments described herein. Those skilled in the art will understand that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

What is claimed is:

1. A cooking appliance, comprising:
   a cooking element;
   a user control configured to control an output level of the cooking element through movement of the user control within a range of positions;
   a sensor configured to detect a rate of movement of the user control within the range of positions; and
   a controller coupled to the sensor and configured to determine that the rate of movement of the user control meets an alert criterion, and in response to determining that the rate of movement of the user control meets the alert criterion, selectively generate an alert for a user.

2. The cooking appliance of claim 1, wherein the user control is a rotary control knob, and the rate of movement of the user control within the range of positions is an angular velocity of the rotary control knob detected by the sensor.

3. The cooking appliance of claim 1, wherein the controller is further configured to adjust the alert criterion based on user input.

4. The cooking appliance of claim 1, wherein the sensor includes a position sensor.

5. The cooking appliance of claim 4, wherein the position sensor includes an encoder, a hall effect sensor, or a toothed wheel.

6. The cooking appliance of claim 1, wherein the controller is further configured to determine that the rate of movement of the user control meets the alert criterion when the cooking element is in an off state, and in response to determining that the rate of movement of the user control meets the alert criterion, disable energization of the cooking element in the off state.

7. The cooking appliance of claim 1, wherein the controller is further configured to determine that the rate of movement of the user control meets the alert criterion when the cooking element is in an on state, and in response to determining that the rate of movement of the user control meets the alert criterion, disable alteration of the output level of the cooking element in the on state.

8. The cooking appliance of claim 1, wherein the sensor is further configured to detect a direction of movement of the user control, the controller is further configured to determine that the rate of movement of the user control meets the alert criterion and the direction of movement of the user control is an output level increasing direction for the cooking element when the cooking element is in an on state, and in response to determining that the rate of movement of the user control meets the alert criterion and the direction of movement of the user control is the output level increasing direction for the cooking element, disable alteration of the output level of the cooking element.

9. The cooking element of claim 1, wherein the sensor is further configured to detect a direction of movement of the user control, the controller is further configured to determine that the rate of movement of the user control meets the alert criterion and the direction of movement of the user control is an output level decreasing direction for the cooking element when the cooking element is in an on state, and in response to determining that the rate of movement of the user control meets the alert criterion and the direction of movement of the use control is the output level decreasing direction for the cooking element, allow de-energization or alteration of the output level of the cooking element in the on state.

10. The cooking element of claim 1, wherein the controller is further configured to determine that the rate of movement of the user control meets the alert criterion when the cooking element is in an on state, and in response to determining that the rate of movement of the user control meets the alert criterion, keep the generated alert remaining actuated for a predetermined period of time and disable alteration of the output level of the cooking element.

11. The cooking element of claim 10, wherein the controller is further configured to determine whether an alert deactivation mechanism is triggered during the predetermined period of time, and in response to determining that no alert deactivation mechanism is triggered during the predetermined period of time, allow de-energization or alteration of the output level of the cooking element in the on state and keep the generated alert remaining actuated until the alert deactivation mechanism is triggered.

12. The cooking appliance of claim 1, wherein the cooking element is a gas cooking element.

13. The cooking appliance of claim 12, wherein the sensor includes a flow meter, and the rate of movement of the user control within the range of positions is a rate of gas flow change detected by the flow meter.

14. The cooking appliance of claim 12, further comprising a gas valve configured to regulate a gas flow rate to the gas cooking element, wherein the user control is mechanically coupled to the gas valve.

15. A cooking appliance, comprising:
a plurality of cooking elements;
a plurality of user controls configured to control output levels of the plurality of cooking elements through movement of each of the plurality of user controls within a range of positions;
one or more sensors configured to detect a rate of movement of each of the plurality of user controls within the range of positions therefor; and
a controller coupled to the one or more sensors and configured to determine that the rate of movement of one of the plurality of user controls meets an alert criterion, and in response to determining that the rate of movement of the one of the plurality of user controls meets the alert criterion, selectively generate an alert for a user.

16. The cooking appliance of claim 15, wherein each of the plurality of user controls is a rotary control knob, and the rate of movement of each of the plurality of user controls within the range of positions is an angular velocity of the rotary control knob detected by the one or more sensors.

17. The cooking appliance of claim 15, wherein the controller is further configured to determine that the rate of movement of one of the plurality of user controls meets the alert criterion when a corresponding cooking element is in an off state, and in response to determining that the rate of movement of the one of the plurality of user controls meets the alert criterion, disable energization of the corresponding cooking element.

18. The cooking appliance of claim 15, wherein the controller is further configured to determine that the rate of movement of one of the plurality of user controls meets the alert criterion when a corresponding cooking element is in an on state, and in response to determining that the rate of movement of the one of the plurality of user controls meets the alert criterion, disable alteration of the output level of the corresponding cooking element.

19. The cooking appliance of claim 15, wherein the plurality of cooking elements are a plurality of gas cooking elements.

20. The cooking appliance of claim 19, wherein the one or more sensors include a flow meter, and the rate of movement of each of the plurality of user controls within the range of positions is a rate of gas flow change detected by the flow meter.

* * * * *